(12) United States Patent
Mayer

(10) Patent No.: US 11,381,303 B2
(45) Date of Patent: Jul. 5, 2022

(54) TASK DELEGATION IN A SATELLITE NETWORK

(71) Applicant: Michael Mayer, Ottawa (CA)

(72) Inventor: Michael Mayer, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/095,245

(22) Filed: Nov. 11, 2020

(65) Prior Publication Data

US 2022/0149931 A1 May 12, 2022

(51) Int. Cl.
*H04B 7/185* (2006.01)
*H04W 40/04* (2009.01)

(52) U.S. Cl.
CPC ..... *H04B 7/18539* (2013.01); *H04B 7/18519* (2013.01); *H04B 7/18521* (2013.01); *H04B 7/18584* (2013.01); *H04B 7/18586* (2013.01); *H04W 40/04* (2013.01)

(58) Field of Classification Search
CPC .......................... H04B 7/185–195; H04W 4/40
See application file for complete search history.

(56) References Cited

U.S. PATENT DOCUMENTS

| | | | | |
|---|---|---|---|---|
| 5,372,340 A | * | 12/1994 | Ihara | B64G 1/1085 244/172.5 |
| 5,625,868 A | * | 4/1997 | Jan | H04B 7/18539 342/352 |
| 6,081,710 A | | 6/2000 | Sherman et al. | |
| 6,522,636 B1 | | 2/2003 | Hogberg et al. | |
| 2013/0032673 A1 | * | 2/2013 | Kobayashi | B64G 1/26 244/164 |
| 2016/0191144 A1 | * | 6/2016 | Nate | H01L 31/042 307/80 |
| 2016/0363112 A1 | * | 12/2016 | Plews | F03G 7/10 |
| 2019/0223250 A1 | * | 7/2019 | Dao | H04W 76/20 |
| 2020/0198811 A1 | * | 6/2020 | Hahn, III | B64G 1/242 |

FOREIGN PATENT DOCUMENTS

CN 110809292 A 2/2020

* cited by examiner

*Primary Examiner* — Raymond S Dean

(57) ABSTRACT

A method comprising determining, by a function, that a first satellite lacks processing or communication capabilities; and routing data traffic, by the function, from the first satellite to a second satellite, the second satellite having higher processing or communication capabilities than the first satellite. The processing and communication capabilities of the first and second satellite are directly related to their power availability, which is derived from solar energy means. Another method comprising determining, by a function, that a first satellite cannot provide computing or communication resources; migrating data, by the function, from the first satellite to a second satellite that can provide the computing or communication resources; computing the data, by the computing resources of the second satellite; and transmitting computed data, by the function, from the second satellite to the first satellite.

22 Claims, 8 Drawing Sheets

400 ↘

402 Determining that a first solar powered satellite has a capability limitation relative to a task, said capability limitation being a processing limitation, a communication limitation, or a combination thereof, said capability limitation being due at least in part to a power limitation at the first solar powered satellite, said power limitation due at least in part to a limitation in solar energy.

404 In response to determining that the first solar powered satellite has said capability limitation, migrating the task from the first solar powered satellite toward a second solar powered satellite.

602 Determine, by a resource negotiation function (RNF), that a first infrastructure node is unable to provide data computing and/or communication resources within budget, the first infrastructure node being a solar powered satellite.

604 Migrate data, by the RNF, from the first infrastructure node to a second infrastructure node that is able to provide data computing and/or communication resources, the second infrastructure node being a solar powered satellite.

606 Compute the data, by the data computing and/or communication resources of the second infrastructure node.

608 Migrate the computed data, by the RNF, from the second infrastructure node to the first infrastructure node.

FIG. 6

TASK DELEGATION IN A SATELLITE NETWORK

FIELD OF THE INVENTION

The present invention pertains to the use of satellite technology, and in particular to methods, devices and a system for task delegation in a satellite network for power conservation.

BACKGROUND

Satellite technology is often seen as a means of communicating with subscribers without the need to deploy terrestrial (including microwave) links to land-based base stations. Indeed, mobile operators are beginning to invest in technologies that promise to deliver wireless satellite communication services directly to mobile users over satellite networks. This also mirrors work conducted in wireless standards bodies such as 3rd Generation Partnership Project (3GPP). In the regulatory context, this service model is called a mobile satellite service.

Many of those involved in space technology have also made forays into realm of satellite technology for the purposes of providing broadband connectivity to remote users. This service differs only slightly as in this fixed satellite service, the user terminal is not mobile. Some of this work is likely being driven by the desire by regulators to find technologies to reach remote users. It has been well known that the availability of high-speed internet connectivity is directly tied to the GDP growth of least developed countries.

For both fixed and mobile satellite cases, there is an expectation that users will demand service levels that are comparable with service provided over terrestrial systems. Although satellites have been used for decades in telecommunications, this demand for equivalent service can only be met by using low Earth orbit (LEO) satellites such that transmission delay is minimized. Since the satellites are close to the surface of the Earth, their coverage range becomes restricted, and thus many satellites are required to provide full coverage over a geographic area on Earth. The so called "mega-constellations" of satellites are expected to operate many thousands of satellites.

Since the cost of such a network will be substantial, the satellite industry is now attempting to build low-cost satellites to be launched in large groups. The capacity of these systems is expected to be sufficient initially, but as the satellite networks evolve, the amount of traffic carried on the network increases, and the satellites age. A critical component of the satellites is the electrical power consumption. Typical satellites rely on solar power which is limited. This in turn limits the satellite's processing and communication capabilities.

Accordingly, there is a need for methods and apparatus which make better use of solar energy in satellite networks that are not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide methods and a system for task delegation in a satellite network in relation to power conservation.

An aspect of the disclosure provides for a method. The method includes determining that a solar powered satellite has a capacity limitation relative to a task, due at least in part to a power limitation at the first solar powered satellite. The power limitation is due at least in part to a limitation in solar energy. The capacity limitation can be a data processing limitation, a communication limitation, or a combination thereof. The method further includes in response to determining that the first solar powered satellite has said limited capabilities, migrating the task from the first solar powered satellite to a second solar powered satellite.

In some embodiments the capacity limitation is indicative that the first satellite is unable to perform the task within limitations imposed by a power budget which depends on the power limitation. In some embodiments at least part of the solar energy is stored using a battery. In some embodiments the task comprises a data processing task. In some such embodiments migrating the task comprises one of both of instructing the second solar powered satellite to perform the data processing task, and transmitting input data for the data processing task toward the second solar powered satellite. In some embodiments, migrating the data processing task comprises instructing the second solar powered satellite to perform the data processing task and communicate a result of the data processing task to the first solar powered satellite. In some embodiments the task comprises a satellite-to-ground communication task. In some such embodiments migrating the task comprises transmitting data to be communicated in the satellite-to-ground communication to the second solar powered satellite and instructing the second solar powered satellite to transmit the data toward a ground station for routing toward a destination. In some embodiments the determination is performed by a resource negotiation function (RNF) which is located at one or both of the first solar powered satellite and the second solar powered satellite. In some embodiments migrating the task is via a logical channel. In some embodiments migrating the task is via a direct channel. In some embodiments the direct channel is a time-division multiplexing (TDM) channel. In some embodiments the determining step is based on at least one of an existing battery state of the first solar powered satellite, a current amount of solar power available to the first solar powered satellite, an anticipated future amount of solar power available to the first solar powered satellite, and anticipated future tasks to be performed by the solar powered satellite. In some embodiments power demands of the task depend at least in part on a quality of service requirement for the task. In some embodiments processing capabilities include data processing. In some embodiments the capacity limitation is due at least in part to current capabilities of processing, communication or battery components of the first solar powered satellite. In some embodiments communication capabilities include satellite to radio communications, satellite to satellite communications, and satellite to ground station communications. In some embodiments solar energy means includes that an infrastructure node is currently bathed in sunlight, or that the battery of an infrastructure node has been charged from the infrastructure node recently being bathed in sunlight.

Another aspect of the disclosure provides for an infrastructure node. The infrastructure node includes at least one network interface, at least one processor, and a non-transient computer readable memory for storing instructions. The instructions, which when executed by the at least one processor, configure the infrastructure node to determine, by a resource negotiation function (RNF), that the infrastructure node has limited processing capabilities, communication capabilities, or both, the infrastructure node being a solar powered satellite. The instructions further configure the infrastructure node to migrate a task, by the RNF, from the infrastructure node to another infrastructure node, the another infrastructure node being a solar powered satellite and having higher processing capabilities, communication capabilities, or both, than the infrastructure node. The processing and communication capabilities of the infrastructure node and the other infrastructure node are directly related to a power availability of the infrastructure node. The power availability of the infrastructure node and the other infrastructure node are derived from solar energy means. In some embodiments, the RNF is located on at least one of the infrastructure node, and the another infrastructure node.

Another aspect of the disclosure provides for a method of providing mobile edge computing. The method includes determining, by a resource negotiation function (RNF), that a first infrastructure node is unable to provide data computing resources, communication resources, or both, the first infrastructure node being a solar powered satellite. The method further includes migrating data, by the RNF, from the first infrastructure node to a second infrastructure node that is able to provide data computing resources, communication resources, or both, the second infrastructure node being a solar powered satellite. The method further includes computing the data, by the data computing and communication resources of the second infrastructure node. The method further includes migrating said computed data, by the RNF, from the second infrastructure node to the first infrastructure node. The data computing resources of the first and second infrastructure node are directly related to a power availability of the first and second infrastructure node. The power availability of the first and second infrastructure node are derived from solar energy means. In some embodiments the second infrastructure node is the immediate neighbour of the first infrastructure node. In some embodiments the second infrastructure node is not the immediate neighbour of the first infrastructure node. In some embodiments the first infrastructure node and the second infrastructure node both contain an instance of the RNF. In some embodiments the data to be computed is migrated from the first infrastructure node through an intermediate infrastructure node in order to reach the second infrastructure node. In some embodiments the intermediate infrastructure node contains an instance of the RNF. In some embodiments the first infrastructure node is one of a satellite and a ground station. In some embodiments the second infrastructure node is one of a satellite and a ground station.

Another aspect of the disclosure provides for a solar powered satellite. The solar powered satellite includes at least one network interface, at least one processor, and a non-transient computer readable memory for storing instructions. The instructions, which when executed by the at least one processor, cause the satellite to determine that the satellite has a capacity limitation relative to a task, said capacity limitation being a processing limitation, a communication limitation, or a combination thereof, said capacity limitation being due at least in part to a power limitation at the satellite, said power limitation due at least in part to a limitation in solar energy. The instructions further configure the satellite in response to determining that the satellite has said capacity limitation, migrating the task from the satellite toward a another solar powered satellite A further aspect of the disclosure provides for a communication system including a plurality of solar powered satellites, each solar powered satellite of the plurality of solar powered satellite including at least one processor and a memory storing instruction for execution by the at least one processor to cause a first solar powered satellite of the plurality of solar powered satellites to operate as a radio access network (RAN) processor to send control information to a set of solar powered satellites from the plurality of solar powered satellites.

BRIEF DESCRIPTION OF THE FIGURES

Further features and advantages of the present invention will become apparent from the following detailed description, taken in combination with the appended drawings, in which:

FIG. 4 depicts a method of migrating a task, according to embodiments of the present invention.

FIG. 6 depicts a method of providing mobile edge computing, according to embodiments of the present invention.

It will be noted that throughout the appended drawings, like features are identified by like reference numerals.

DETAILED DESCRIPTION

Figure 1:
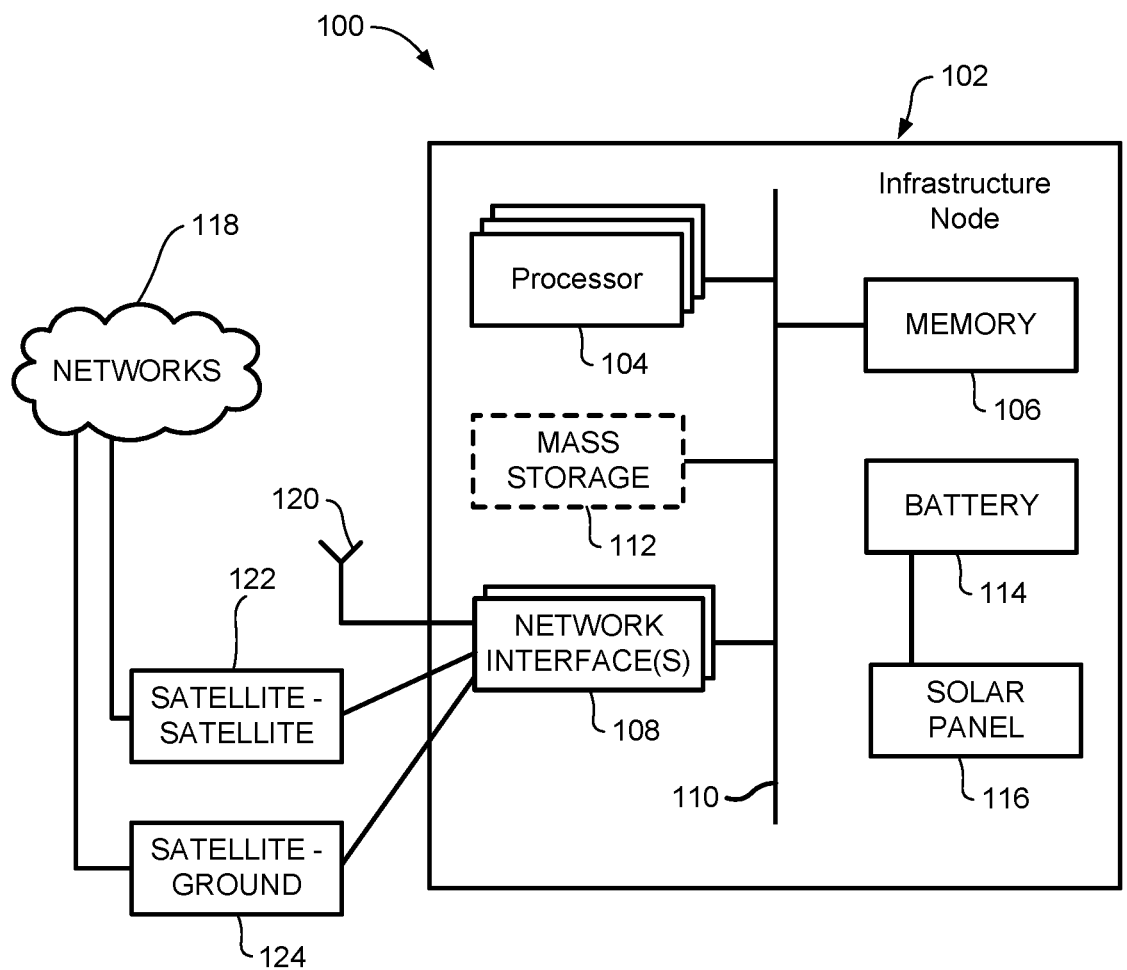
FIG. 1 depicts a block diagram of an infrastructure node that may be used for implementing embodiments of the present invention.

Satellites used for telecommunication applications have so far been used mainly in a bent-pipe configuration (i.e. as independent relays) or in cases where limited networking capability exists. In order to provide ubiquitous service with service levels matching, or in some cases, exceeding service levels provided by terrestrial technology, LEO satellites are being deployed. These now require networking at the satellite level. Satellite networks are anticipated to be an integral part of the data network. As such, satellites will need to perform the necessary migrating and switching functions that are performed today in terrestrial networks.

Embodiments of the present invention provide for a method, apparatus and system involving network infrastructure nodes (e.g. satellites in low earth orbit or another type of orbit), and in which certain tasks are assigned and migrated to nodes which are more suited to handling them. In particular, power-intensive tasks may be migrated from nodes which have or are expected to have lower power resources to nodes which have or are expected to have higher power resources. Such tasks may include computing (data processing) tasks for example as performed in accordance with mobile edge computing or another service which performs in-network processing of data. Such tasks may include satellite-to-ground station communication tasks (e.g. in the uplink, downlink or both), which involve signaling and signal processing. Power resources may be higher at nodes which are exposed to sunlight than nodes which are not exposed to sunlight, due to use of solar power. Power resources may be higher at nodes which have batteries which have a higher charge due to exposure to sunlight, due to battery charging using solar power. Power resources may correspond to current available power, expected future available power given anticipated tasks, or a combination thereof. In some embodiments, a power budget may be provided given an anticipated charging schedule and schedule of tasks, and power resources may be determined based on the power budget. Additionally or alternatively to consideration of power resources, tasks may be migrated based on availability of other resources. For example, some nodes may have more computer processing power or communication capabilities than other nodes, and tasks may be migrated to nodes having higher available processing power or communication capabilities. Availability may be determined considering current demands on nodes.

Embodiments of the present invention include a mechanism to determine which satellites have sufficient power for performing a task. This may be based, for example, on a schedule (or almanac) that describes which satellites are in sunlight, or the mechanism may be based on a messaging system by which satellites advertise their capabilities. Satellite and communication operators may thus be able to manually route (e.g. high latency) tasks to satellites that have sufficient power or, for scheduled and regular activities, satellites may be pre-configured or programmed to perform, send or receive certain (e.g. high latency) tasks on a regular basis.

Embodiments of the present invention further include a budgeting mechanism by which satellites can determine their current availability for performing tasks based on anticipated future events. For example, a satellite may be in sunlight, but may anticipate being in shadow soon with many tasks to perform and therefore might not be available for computing tasks at the later time. Anticipated future events may be based up a schedule or almanac system as well such that satellites may be pre-configured to have intensive tasks when they are, for example, over a particular region at a particular time of the day. A satellite can be determined to have a capacity limitation when it has insufficient power to perform a task while also respecting a power budget. The power budget in turn depends on a current power limitation, such as a current battery charge level or expected state of battery charge level in future, due to anticipated recharging events and other power demands. A capacity limitation can alternatively be referred to as a capacity limitation or a limited capacity to perform a certain task.

Embodiments of the present invention further include power-aware migration of communication tasks. For example, instead of assigning a downlink communication operation to a satellite directly over the ground station closest to a destination, the downlink communication operation may be assigned to a satellite near another ground station. Then the last leg of communication is performed on the ground. The satellite assigned to the downlink communication operation may be chosen for a variety of reasons including, but not limited to, because it is in sunlight, or because it has a fully charged battery, or because it is anticipated to be in sunlight again soon.

More generally, embodiments of the present invention include performing load balancing across satellites, which is based at least in part on power availability. The power availability can be based on: current or anticipated future sunlight; solar panel charging capabilities (accounting for degradation over time); current or anticipated future battery energy storage. Anticipated future battery energy storage can be determined based on anticipated operations to be performed, anticipated future charging opportunities, or the like.

FIG. 1 is a block diagram of an infrastructure node 102 illustrated within a computing and communications environment 100 that may be used for implementing the devices and methods disclosed herein. It is contemplated that the infrastructure node 102 includes an aerial infrastructure node, such as a satellite. In some embodiments, the infrastructure node 102 may be an element of communications network infrastructure, such as a base station. Specific devices may utilize all of the components shown or only a subset of the components, and levels of integration may vary from device to device. Furthermore, an infrastructure node 102 may contain multiple instances of a component, such as multiple processors, memories, transmitters, receivers, etc. The infrastructure node 102 typically includes a processor 104, such as a Central Processing Unit (CPU), and may further include specialized processors such as a Graphics Processing Unit (GPU) or other such processor, a memory 106, a network interface 108 and a bus 110 to connect the components of infrastructure node 102. The infrastructure node 102 may optionally also include components such as one or more of: a mass storage device 112, a battery 114, and a solar panel 116.

The memory 106 may comprise any type of non-transitory system memory, readable by the processor 104, such as static random access memory (SRAM), dynamic random access memory (DRAM), synchronous DRAM (SDRAM), read-only memory (ROM), or a combination thereof. In an embodiment, the memory 106 may include more than one type of memory, such as ROM for use at boot-up, and DRAM for program and data storage for use while executing programs. The bus 110 may be one or more of any type of several bus architectures including a memory bus or memory controller, or a peripheral bus.

The infrastructure node 102 may also include one or more network interfaces 108, which may include at least one of a wired network interface and a wireless network interface. As illustrated in FIG. 1, network interface 108 may include a satellite to satellite network interface 122 and a satellite to ground network interface 124 to connect to a network 118. In this manner, the infrastructure node 102 may communicate with other satellites or ground stations. The infrastructure node 102 may also include a radio access network interface 120 for connecting to other devices over a radio link. The network interfaces 108 allow the infrastructure node 102 to communicate with remote entities such as those connected to network 118. Through the network interfaces 108, the infrastructure node 102 may perform communication tasks and possibly computing (e.g., edge computing) tasks. Edge computing can correspond to processing data on behalf of a client device, such as a user equipment device on the ground.

The mass storage 112 may comprise any type of non-transitory storage device configured to store data, programs, and other information and to make the data, programs, and other information accessible via the bus 110. The mass storage 112 may comprise, for example, one or more of a solid state drive, hard disk drive, a magnetic disk drive, or an optical disk drive. In some embodiments, mass storage 112 may be remote to the infrastructure node 102 and accessible through use of a network interface such as interface 108. In the illustrated embodiment, mass storage 112 is distinct from memory 106 where it is included, and may generally perform storage tasks compatible with higher latency, but may generally provide lesser or no volatility. In some embodiments, mass storage 112 may be integrated with a heterogeneous memory 106.

The battery 114 and the solar panel 116 provide internal and external sources of power for the infrastructure node 102. The solar panel 116 may be used to power the infrastructure node 102, and to also charge the battery 114 for when the infrastructure node 102 is not bathed in sunlight.

In some embodiments, infrastructure node 102 may be a standalone device, while in other embodiments infrastructure node 102 may be resident within a data center, such as a satellite-based data center. A data center, as will be understood in the art, is a collection of computing resources that can be used as a collective computing and storage resource. Within a data center, a plurality of infrastructure nodes 102 can be operated together to provide a computing resource pool upon which virtualized entities can be instantiated. Data centers can be interconnected with each other to form networks consisting of pools computing and storage resources connected to each by connectivity resources. The connectivity resources may take the form of physical connections such as radio or optical communications links. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

The person having skill in the art will reasonably understand that the infrastructure node 102 may be used to implement the methods and systems disclosed herein.

Figure 2:
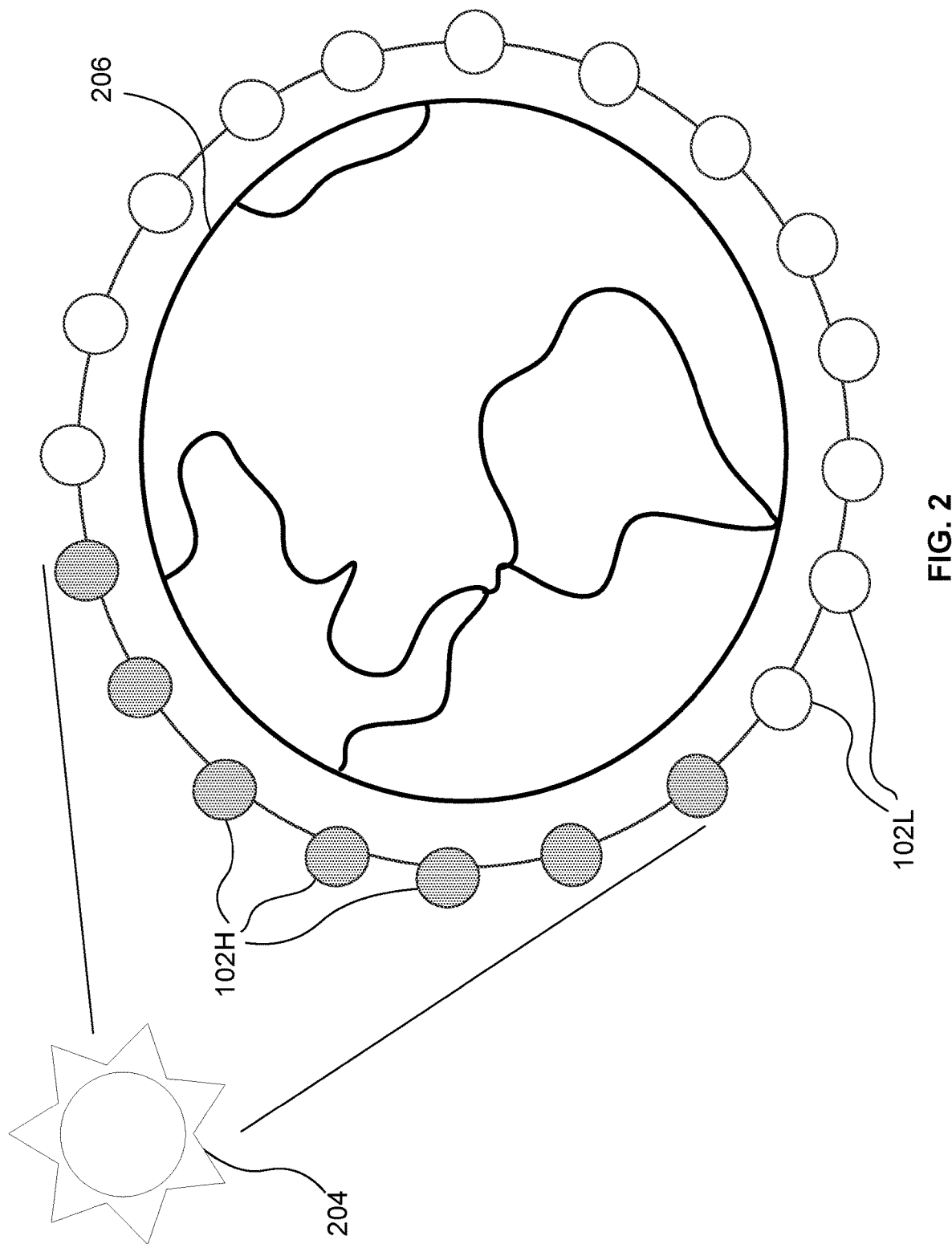
FIG. 2 depicts an example simplified orbit of infrastructure nodes around the Earth, according to embodiments of the present invention.

FIG. 2 depicts a simplified, single orbit of infrastructure nodes 102H (high power) and 102L (low power) around the Earth 206. Infrastructure nodes include satellite network nodes. An orbit may refer to a train of satellites which are spaced-apart but follow the same orbital path. Multiple different orbits may be provided to form a satellite constellation. It is considered that satellites are powered by solar energy, which typically also charges a battery. Therefore, satellites which are bathed in sunlight are considered to have higher available power than those which are in shadow. The infrastructure nodes 102L (unshaded) are depicted as not being in direct exposure of sunlight, from the sun 204. Infrastructure nodes 102H (shaded) are depicted as being exposed to sunlight from sun 204. Infrastructure nodes 102H are thus able to use technology such as solar panels to convert the sunlight from the sun 204 into electrical power, at a higher rate than infrastructure nodes 102L.

As network communication traffic increases, each infrastructure node 102 within the constellation of infrastructure nodes 102 may be called upon to perform a greater amount of processing and communication operations. While the infrastructure nodes 102 will typically be equipped with solar panels and batteries, they are expected to be continuously operational (the so-called "twenty-four-seven" (24/7) mode of operation). Depending on the infrastructure node 102 orbit altitude, infrastructure nodes 102 maybe subject to high levels of radiation which restrict the choices available to the system designer in terms of processing components.

As an infrastructure node 102 ages, its battery capacity will be diminished. For some infrastructure nodes 102 used in Earth observation for example, sun-synchronous orbits can be chosen to ensure that power is continually available. In the case of a LEO constellation, that may not be possible, and infrastructure nodes 102 can be expected to be operating during periods when they are in darkness. This, ultimately, can limit the capability (or capacity) of the infrastructure node 102 and other forms of power management are required. Although larger solar panels and batteries can be used, these add launch weight and hence the cost of the network is higher.

The critical functions of infrastructure node stations keep moving toward implementation as electrical systems, such as Ion propulsion systems. As a result, it is a requirement for infrastructure nodes 102 to maintain sufficient power in reserve for these functions. Thus, embodiments of the present invention provide for migrating (moving) communication processes, computing processes, or both, from one infrastructure node 102 to another infrastructure node 102. This can provide for an alternative to shutting down data processing due to power limitations.

Figure 3:
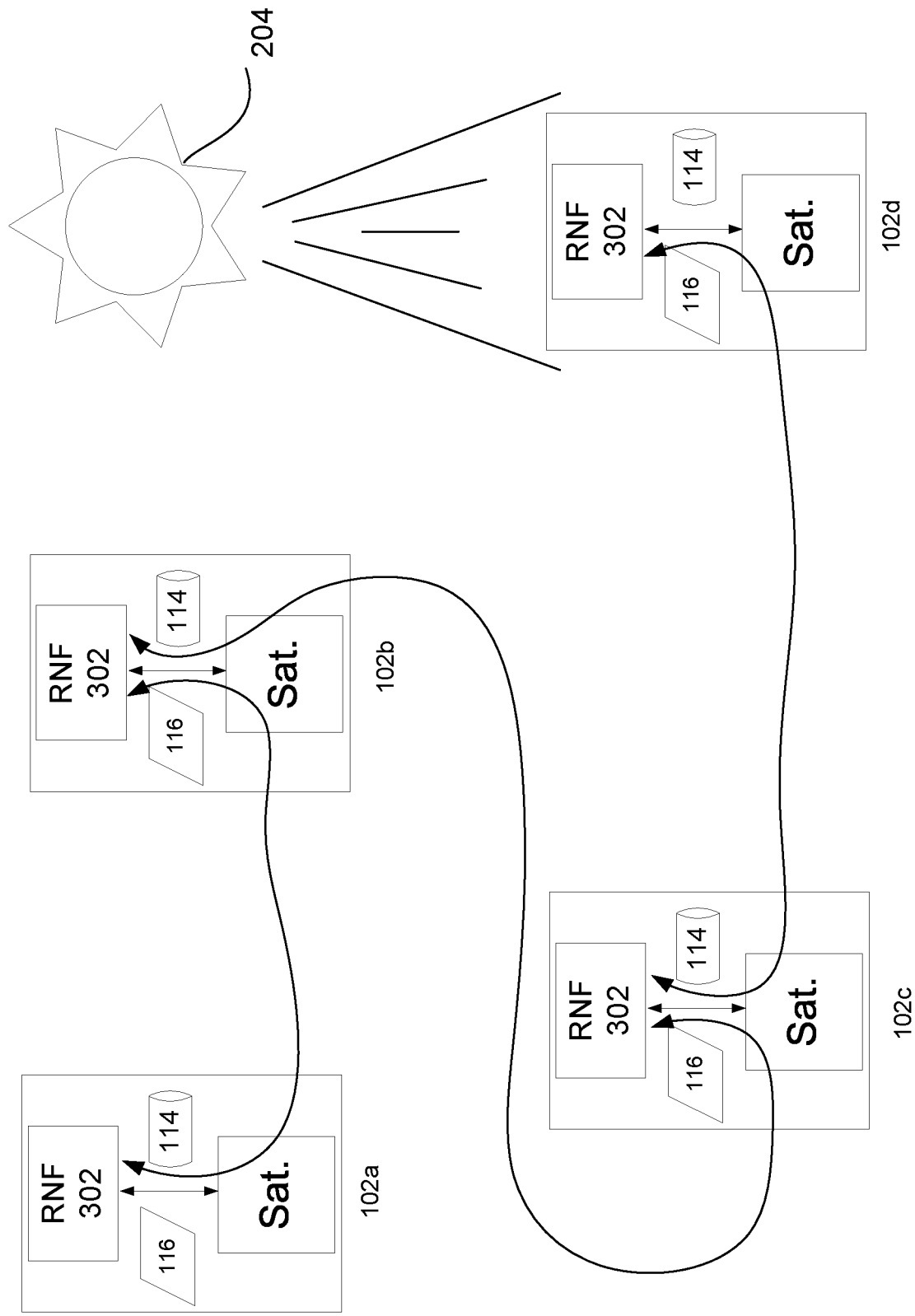
FIG. 3 depicts an example illustration of a task being migrated, according to embodiments of the present invention.

As such, embodiments of the present invention are configured to move high power consuming functions away from infrastructure nodes 102 that are not bathed in sunlight, and move them through the network of infrastructure nodes 102 to those that are better powered, for example due to being currently exposed to sunlight, or due to having a battery which is adequately charged due to prior exposure to sunlight. FIG. 3 depicts a simplified illustration of this concept. In FIG. 3, of the infrastructure nodes 102a-102d, only 102d is currently bathed in sunlight and is thus better suited to carry out high power consumption tasks. Such tasks can include computing operations, communication with ground stations, or a combination thereof. RNF 302 refers to a resource negotiation function instantiated within each infrastructure node 102 that negotiates the transfer of tasks. The RNF can be provided as a functionality of an infrastructure node for example as provided by a (e.g. stand-alone) electronic circuit or via an appropriately configured computer processor operatively coupled to memory. Also depicted in FIG. 3 are solar panels 116 and batteries 114, which reside on each infrastructure node 102.

FIG. 4 depicts a method 400 of migrating a task. The method includes, at step 402, determining, for example by a resource negotiation function (RNF), that a first infrastructure node 102 has a capacity limitation, which is due at least in part to a power limitation at the first infrastructure node, which is a solar powered satellite. The capacity limitation is relative to a task to be performed, such as a communication or (e.g. edge) computing task. The capacity limitation can be a processing limitation, a communication limitation, or a combination thereof. For example, limited processing or communication capabilities can be due to limited available power, such as power directly from solar energy or power from a battery charged using solar energy. The method further includes, at step 404, in response to the determination in step 402, migrating the task from the first infrastructure node 102 to a second infrastructure node 102, the second infrastructure node 102 being a solar powered satellite and having higher processing capabilities than the first infrastructure node 102. The migration can be performed by the RNF. The processing and communication capabilities of the first and second infrastructure node 102 are directly related to a power availability of the first and second infrastructure node 102. The power availability of the first and second infrastructure node 102 is derived from solar energy means. The RNF may be located on either or both of the first and second infrastructure node 102 in order to facilitate migration of a task. Communication capabilities of an infrastructure node 102 may include satellite to radio communications, satellite to satellite communications, and satellite to ground station communications. As a result of these different types of communications, a task may be migrated in several variations, for example, from a ground station, to a satellite, to a radio station. Migrating a task can include migrating data traffic for example by rerouting the data traffic. Migrating a task can include migrating a processing function or software agent.

Figure 5:
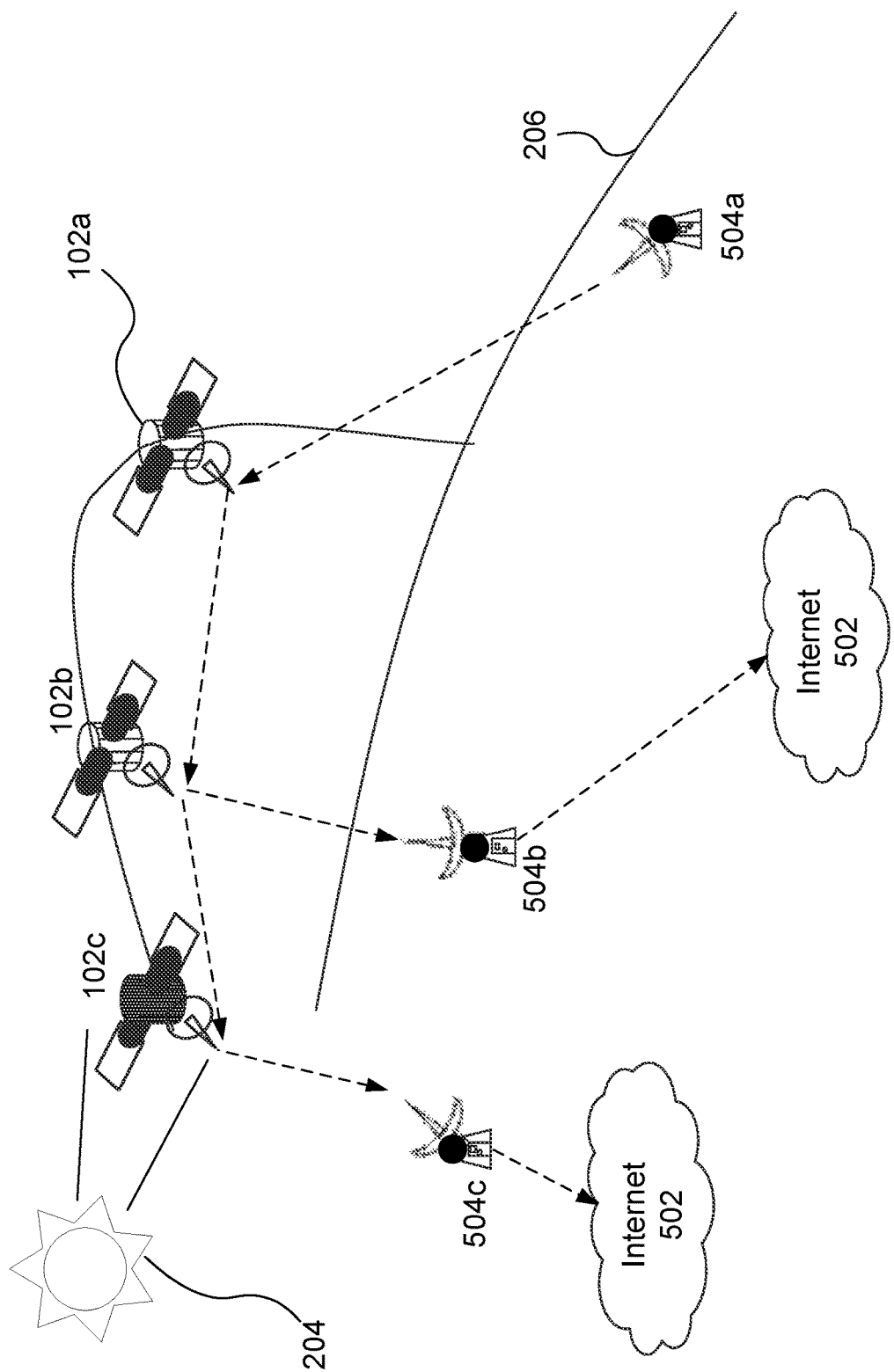
FIG. 5 depicts an example embodiment of the method of FIG. 4, according to embodiments of the present invention.

FIG. 5 depicts an example embodiment of the method of FIG. 4. In FIG. 5, a ground station 504a sends data traffic to a first infrastructure node 102a. The RNF of the first infrastructure node 102a determines that infrastructure node 102a has limited processing capabilities, for example due to limited power and the infrastructure node 102a being in shadow. The RNF therefore causes the data traffic to be migrated through infrastructure node 102b to infrastructure node 102c, where infrastructure node 102c is bathed in sunlight (as shown by its darker body) and has sufficient processing capabilities. Data is then processed at infrastructure node 102c and transmitted to ground station 504c, which is connected to the Internet 502, for example. Data requiring less processing may also be transmitted from infrastructure node 102b to, for example, ground station 504b, which is also connected to the Internet 502. The person having skill in the art will reasonably understand that an RNF may be provided at any or all of infrastructure nodes 102a, 102b or 102c. In this case, the task may be to communicate the data traffic, and migrating the task can include rerouting the data traffic.

Instead of an infrastructure node 102 that is in darkness performing a downlink transmission, sending the transmission to a sunbathed infrastructure node 102 to perform the downlink transmission may be advantageous as certain transmission, such as satellite to satellite transmissions, may be less energy intensive than downlink transmissions.

Migration of data traffic (or a task) for infrastructure nodes immediately connected to one another may be via a logical channel or a direct channel. The direct channel may be a time-division multiplexing (TDM) channel, for example. In a logical channel, the infrastructure node management systems may configure the channel used by the RNF. A direct channel does not share its bandwidth with user data, while a logical channel may share bandwidth with user data. In the case of a logical channel, user data may be given priority over RNF communication, or vice-versa.

Processing capabilities of an infrastructure node may be directly proportional to a power level of the infrastructure node. The power level in turn may depend on battery capacity and exposure to sunlight. Infrastructure nodes may be satellites, however it is also considered that one or more infrastructure nodes may be ground stations.

The RNF process determines whether a particular process should be moved to a neighboring infrastructure node. The determining step may be based on at least one of an existing or anticipated battery state of the first infrastructure node 102, an existing or anticipated exposure to sunlight for powering the infrastructure node, an anticipated future loading of the first infrastructure node 102, and a quality of service (QoS) of the first infrastructure node. For certain traffic, QoS precludes any re-routing of traffic. Examples of traffic that fall into this situation may include time or link sensitive information (for example, for 5G backhaul). The RNF can determine if, for example, the infrastructure node will be entering an area of normally low traffic (for example, over the polar regions). In cases like these, because the traffic load is expected to drop, the RNF can make a determination to not take any action as the drain on the system capacity is known to be short.

Examples of processes that may be moved by the RNF include routing and route table computations. In the case of routing, the RNF will communicate to a local neighbor to offload routing. The RNF can also inform the originator of the traffic, by relaying messages via other RNFs to the RNF associated with the data source. This may allow the data source to update their route selection to avoid the specific infrastructure node.

In some cases, an infrastructure node may be providing mobile broadband service from an isolated ground station, or a directly connected infrastructure node user, to a ground station acting as a gateway to a terrestrial network such as the Internet. In this situation, if the infrastructure node link to the gateway is via an infrastructure that is not bathed in sunlight, then the RNF can select to reroute to a gateway reachable from an infrastructure node that is in a "full power" state (e.g. due to being bathed in sunlight).

FIG. 6 depicts a method 600 of providing mobile edge computing. The method includes, at step 602, determining, by a resource negotiation function (RNF), that a first infrastructure node 102 is unable to provide data computing resources while also respecting its current budget (e.g. power or computing budget) requirements. The method further includes, at step 604, migrating data, by the RNF, from the first infrastructure node 102 to a second infrastructure node 102 that is able to provide data computing resources within its own current budget requirements. The method further includes, at step 606, computing the data, by the data computing resources of the second infrastructure node 102. The method further includes, at step 608, migrating said computed data, by the RNF, from the second infrastructure node 102 to the first infrastructure node 102. The data computing and communication resources of the first and second infrastructure node 102 are directly related to a power availability of the first and second infrastructure node 102. The power availability of the first and second infrastructure node 102 is derived from solar energy means. Budget requirements may refer to requirements to only use a certain predetermined amount of power or computing resources for certain types of tasks. The current budget requirement may depend for example on a current battery level or an anticipated battery level due to anticipated future charging or discharging status. Budget requirements may include requirements to preserve a certain amount of battery power for future operations, in anticipation of future recharging at a given time.

In some embodiments, state information may be exchanged between infrastructure nodes, for example using status update messages, which may be control plane messages. This state information can represent the current capabilities of infrastructure nodes, such as availability of processing capabilities, energy storage levels, charging status, etc. Offloading of processing or communication tasks can be performed based on such state information. This may allow processing to be offloaded to an infrastructure node processor for a computing process. The process may be coupled to a signaling mechanism that negotiates the exchange of processing information and what resources are used on the source infrastructure node. Typically, communication interfaces may be retained on a source infrastructure node, while the CPU may be provided on the target.

The second infrastructure node 102 may or may not be an immediate neighbour of the first infrastructure node 102. This means that in some embodiments, the data may be migrated through one or more intermediate infrastructure nodes 102 before reaching one that is able to provide the data computing resources. The first infrastructure node 102 and the second infrastructure node 102, and possibly any intermediate infrastructure nodes 102, may each contain an instance of the RNF. Thus, the data to be computed may be migrated from the first infrastructure node 102 through one or more intermediate infrastructure nodes 102 in order to reach the second infrastructure node 102. In various embodiments, infrastructure nodes 102 could be either satellites or ground stations.

Figure 7:
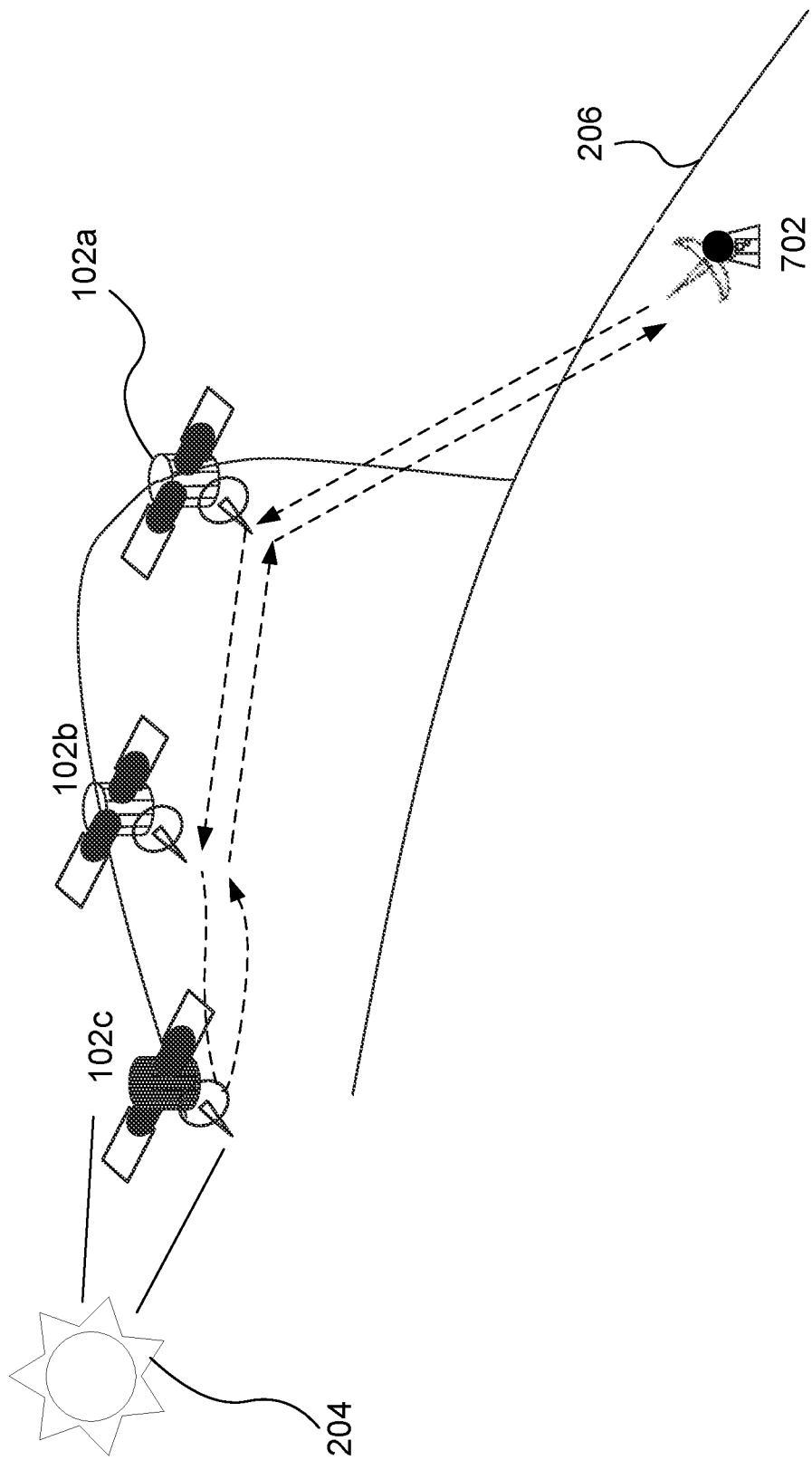
FIG. 7 depicts an example illustration of the method of FIG. 6, according to embodiments of the present invention.

FIG. 7 depicts an example of the method 600 of FIG. 6. In FIG. 7, a ground station 702 sends a request for data computing to a first infrastructure node 102a. In this example, infrastructure node 102a is not able to provide the data computing resources while respecting current budget limitations, so the request is passed on to infrastructure node 102b. Like infrastructure node 102a, infrastructure node 102b is also unable to provide the resources within its own budget limitations, so the request is further passed on to infrastructure node 102c. Infrastructure node 102c is shaded in the drawing to indicate that it is bathed in sunlight from the sun 204. Infrastructure node 102c is able to provide the necessary computing resources. Once the data is computed, it can be "hair-pinned" back through infrastructure nodes 102b and 102a, to ground station 702. That is, the computed data is provided back to the infrastructure node 102a via infrastructure node 102b or another route. Accordingly, a computing task can be performed by migrating the computing task to another node which has higher resources, for example due to being in sunlight which results in higher available computing power. The results of the computing task can then be provided back to the node which was originally required to perform the task.

Where the immediate neighbor infrastructure node cannot accommodate a request, the source infrastructure node may request process information from the neighbor of its immediate neighbor (i.e. a second neighbor) and negotiate for the computing to be performed on the second neighbor infrastructure node. Because the source infrastructure node does not have direct information on the link bandwidth on the link between the immediate neighbor and second neighbor, the RNF may issue a request for this information. Once the information is available, negotiations between the three RNF instances occurs to set up the process request, where the three instances of the RNF are on the source satellite, the immediate neighbor and the second neighbor.

While this process is primarily intended to be used to save power, the underlying processes can be used to manage CPU usage for edge computing in a more general sense. Although the movement of the computing function is shown to be on the infrastructure node, this may also be accomplished by moving the compute function a nearby ground station. As high performance services are expected to require some edge compute functionality, the RNF may support such needs in the case of infrastructure nodes with limited performance capabilities.

Figure 8:
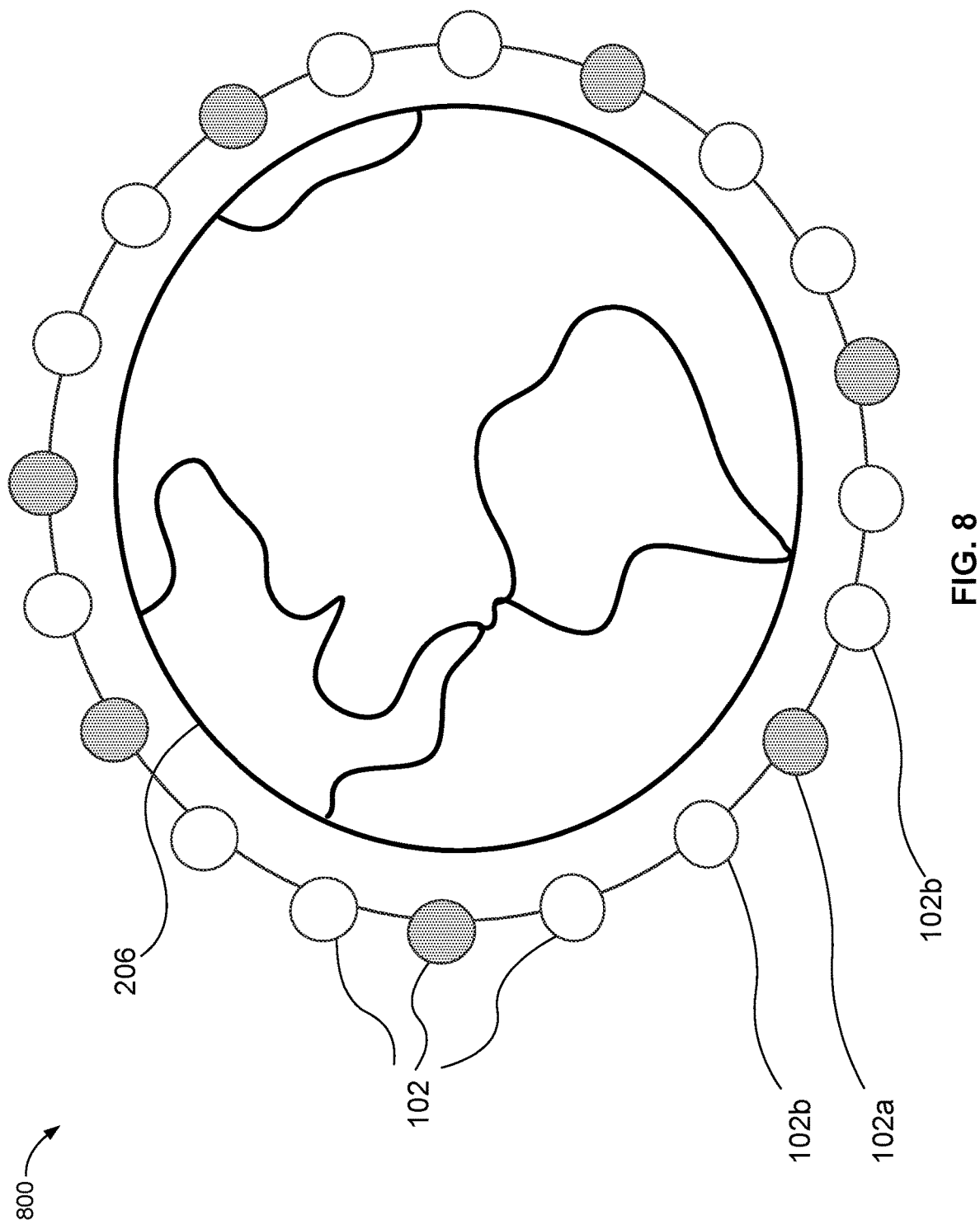
FIG. 8 depicts a communication system, according to embodiments of the present invention.

FIG. 8 depicts a communication system 800. The communication system 800 includes a plurality of infrastructure nodes 102. Each infrastructure node 102 of the plurality includes at least one processor and a memory storing program instruction for execution by the at least one processor. When the instruction is executed by the at least one processor, a first infrastructure node 102a of the plurality of infrastructure nodes 102 operates as a radio access network (RAN) processor to send control information to a set of infrastructure nodes 102b from the plurality of infrastructure nodes 102. The RAN infrastructure nodes 102a are depicted as being shaded in FIG. 8 to better distinguish same.

As some infrastructure nodes 102 are deployed with added processing and power capabilities in order to support offloading, higher capacity infrastructure nodes may be deployed together with the lower capacity infrastructure nodes, or separately, as a way of upgrading the capacity of an infrastructure node network. For example, infrastructure nodes 102a (shaded in FIG. 8) may be provided with higher processing capabilities, communication capabilities, power accumulation and storage components, or a combination thereof, relative to infrastructure nodes 102b (unshaded in FIG. 8). Therefore, infrastructure nodes 102b may offload some tasks to infrastructure nodes 102a. Although alternate infrastructure node capacities are shown, the distribution ratio between normal and high capacity infrastructure nodes may vary.

Thus, this embodiment may serve as a means of increasing the overall capacity of the infrastructure node network. By enabling the RNF to support infrastructure nodes with different processing/power capabilities, the usable life of an infrastructure node may be extended, thus lowering the total cost of providing service over an infrastructure node network.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method comprising:
   determining, by a resource negotiation function (RNF) located at one or both of a first solar powered satellite and a second solar powered satellite, that the first solar powered satellite has a power limitation relative to a computing task, the power limitation due at least in part to a limitation in solar energy at the first solar powered satellite; and
   subsequently migrating, by the RNF, the computing task from the first solar powered satellite toward the second solar powered satellite;
   wherein migrating the computing task comprises instructing the first solar powered satellite to transmit data for the computing task to the second solar powered satellite and instructing the second solar powered satellite to perform the computing task on the data and communicate a result of the computing task to the first solar powered satellite.

2. The method of claim 1, wherein the determining comprises determining, by the RNF, that the first satellite is unable to perform the computing task within limitations imposed by a power budget.

3. The method of claim 1, wherein the power limitation is due to a limitation in an amount of the solar energy stored in a battery of said first solar powered satellite.

4. The method of claim 1, wherein the computing task is an edge computing task.

5. The method of claim 1, further comprising: in response to determining, by the RNF, that the first solar powered satellite has a processing limitation relative to the computing task, migrating the computing task by instructing the first solar powered satellite to transmit the data for the computing task to the second solar powered satellite and instructing the second solar powered satellite to perform the computing task on the data and communicate the result of the computing task to the first solar powered satellite.

6. A method comprising:
determining, by a resource negotiation function (RNF) located at one or both of a first solar powered satellite and a second solar powered satellite, that the first solar powered satellite has a capacity limitation relative to a satellite-to-ground communication task, the capacity limitation being due to at least a power limitation of the first solar powered satellite to perform the satellite-to-ground communication task, the power limitation due at least in part to a limitation in solar energy at the first solar powered satellite; and
subsequently migrating the satellite-to-ground communication task from the first solar powered satellite toward said second solar powered satellite;
wherein migrating the task comprises instructing the first solar powered satellite to transmit data to be communicated in the satellite-to-ground communication task to the second solar powered satellite and instructing the second solar powered satellite to transmit the data toward a ground station for terrestrial routing toward a destination, the ground station being out of communication range of the first solar powered satellite.

7. The method of claim 1, wherein the power limitation is further due to one or a combination of:
an existing battery state of the first solar powered satellite;
a current amount of solar power available to the first solar powered satellite;
an anticipated future amount of solar power available to the first solar powered satellite; and
anticipated future tasks to be performed by the solar powered satellite.

8. The method of claim 1, the power limitation is due at least in part on a quality of service requirement for the computing task.

9. The method of claim 1, wherein the power limitation causes a limitation in the first solar powered satellite's capabilities to process data for the computing task on behalf of a client device or user.

10. A solar powered satellite comprising:
at least one network interface;
at least one processor;
a non-transitory computer readable memory storing instructions which when executed by the at least one processor cause the satellite to:
determine, by a resource negotiation function (RNF) located at one or both of the satellite and another solar powered satellite, that the satellite has a power limitation relative to a computing task, the power limitation due at least in part to a limitation in solar energy at the satellite; and
subsequently migrate, by the RNF, the computing task from the satellite toward the other solar powered satellite;
wherein migrating the data processing task comprises instructing the solar powered satellite to transmit data for the computing task to the another solar powered satellite and instructing the another solar powered satellite to perform the computing task on the data and communicate a result of the computing task to the solar powered satellite.

11. The satellite of claim 10, wherein the determining comprises determining, by the RNF, that the satellite is unable to perform the computing task within limitations imposed by a power budget.

12. The satellite of claim 10, wherein the power limitation is due to a limitation in an amount of the solar energy stored in a battery of the solar powered satellite.

13. A solar powered satellite comprising:
at least one network interface;
at least one processor;
a non-transitory computer readable memory storing instructions which when executed by the at least one processor cause the satellite to:
determine, by a resource negotiation function (RNF) located at one or both of the satellite and another solar powered satellite, that the satellite has a capacity limitation relative to a satellite-to-ground communication task, the capacity limitation being due to at least a power limitation of the satellite to perform said satellite-to-ground communication task, said power limitation due at least in part to a limitation in solar energy; and
subsequently migrate the satellite-to-ground communication task from the satellite toward the another satellite;
wherein migrating the task comprises instructing the satellite to transmit data to be communicated in the satellite-to-ground communication task to the other satellite and instructing the another satellite to transmit the data toward a ground station for terrestrial routing toward a destination, the ground station being out of communication range of the satellite.

14. The satellite of claim 10, wherein the power limitation is further due to one or a combination of:
an existing battery state of the satellite;
a current amount of solar power available to the satellite;
an anticipated future amount of solar power available to the satellite; and
anticipated future tasks to be performed by the satellite.

15. The method of claim 1, wherein migrating the computing task includes migrating a processing function or software agent executing that computing task.

16. The method of claim 5, wherein determining, by the RNF, that the first solar powered satellite has a processing limitation relative to the computing task comprises determining, by the RNF, that the first satellite is unable to provide data computing resources for performing the computing task within limitations imposed by a computing budget.

17. The satellite of claim 10, wherein migrating the computing task includes migrating a processing function or software agent executing that computing task.

18. The satellite of claim 10, wherein the non-transitory computer readable memory stores further instructions which when executed by the at least one processor cause the satellite to: in response to determining, by the RNF, that the first solar powered satellite has a processing limitation relative to the computing task, migrating the computing task by instructing the first solar powered satellite to transmit the data for the computing task to the second solar powered satellite and instructing the second solar powered satellite to perform the computing task on the data and communicate the result of the computing task to the first solar powered satellite.

19. The satellite of claim 18, wherein determining, by the RNF, that the first solar powered satellite has a processing limitation relative to the computing task comprises determining, by the RNF, that the first satellite is unable to provide data computing resources for performing the computing task within limitations imposed by a computing budget.

20. The satellite of claim 10, wherein the power limitation is further due to one or a combination of:
    an existing battery state of the first solar powered satellite;
    a current amount of solar power available to the first solar powered satellite;
    an anticipated future amount of solar power available to the first solar powered satellite; and
    anticipated future tasks to be performed by the solar powered satellite.

21. The method of claim 6, wherein the capacity limitation is further due to a communication limitation to perform said satellite-to-ground communication task.

22. The solar powered satellite of claim 13, wherein the capacity limitation is further due to a communication limitation to perform said satellite-to-ground communication task.

* * * * *